United States Patent [19]
Klaassen et al.

[11] Patent Number: 5,953,173
[45] Date of Patent: Sep. 14, 1999

[54] HIGH CMRR AND SENSOR-DISK SHORT-CIRCUIT PROTECTION DEVICE FOR DUAL ELEMENT MAGNETORESISTIVE HEADS

[75] Inventors: Klaas Berend Klaassen; Jacobus van Peppen, both of San Jose, Calif.

[73] Assignee: International Business Machines Corporation, Armonk, N.Y.

[21] Appl. No.: 08/718,073

[22] Filed: Sep. 17, 1996

[51] Int. Cl.[6] ............................... G11B 5/03; G11B 5/02
[52] U.S. Cl. ................................. 360/66; 360/67
[58] Field of Search ........................ 360/66, 67, 113; 324/207.21

[56] References Cited

U.S. PATENT DOCUMENTS

| | | | |
|---|---|---|---|
| 3,860,965 | 1/1975 | Voegeli | 360/113 |
| 4,012,781 | 3/1977 | Lin | 360/113 |
| 4,691,259 | 9/1987 | Imakoshi et al. | 360/113 |
| 4,878,140 | 10/1989 | Gill et al. | 360/113 |
| 5,216,561 | 6/1993 | Jagielinski | 360/113 |
| 5,323,278 | 6/1994 | Contreras et al. | 360/67 |
| 5,388,014 | 2/1995 | Brug et al. | 360/66 |
| 5,402,064 | 3/1995 | Eck et al. | 324/207.21 |
| 5,701,213 | 12/1997 | Cameron et al. | 360/67 |

FOREIGN PATENT DOCUMENTS

| | | |
|---|---|---|
| 58-91506 | 5/1983 | Japan . |
| 59-104720 | 6/1984 | Japan . |
| 62-9503 | 1/1987 | Japan . |
| 56-68916 | 6/1991 | Japan . |
| 6-60337 | 3/1994 | Japan . |

*Primary Examiner*—Aristotelis M. Psitos
*Assistant Examiner*—Regina Y. Neal
*Attorney, Agent, or Firm*—Khanh Q. Tran; Banner & Witcoff, Ltd.

[57] ABSTRACT

A magnetoresistive transducer biasing technique that provides high common mode rejection ratio (CMRR) for a dual MR sensor head, while providing for short-circuit protection of the sensor elements within the head for short-circuits between the head and a disk.

42 Claims, 8 Drawing Sheets

HIGH CMRR AND SENSOR-DISK SHORT-CIRCUIT PROTECTION DEVICE FOR DUAL ELEMENT MAGNETORESISTIVE HEADS

BACKGROUND OF THE INVENTION

1. Field of the Invention

The present invention relates to magnetoresistive (MR) sensor biasing. More particularly, the present invention relates to magnetoresistive sensor biasing and read-out methods and circuits.

2. Description of the Related Art

Figure 1:
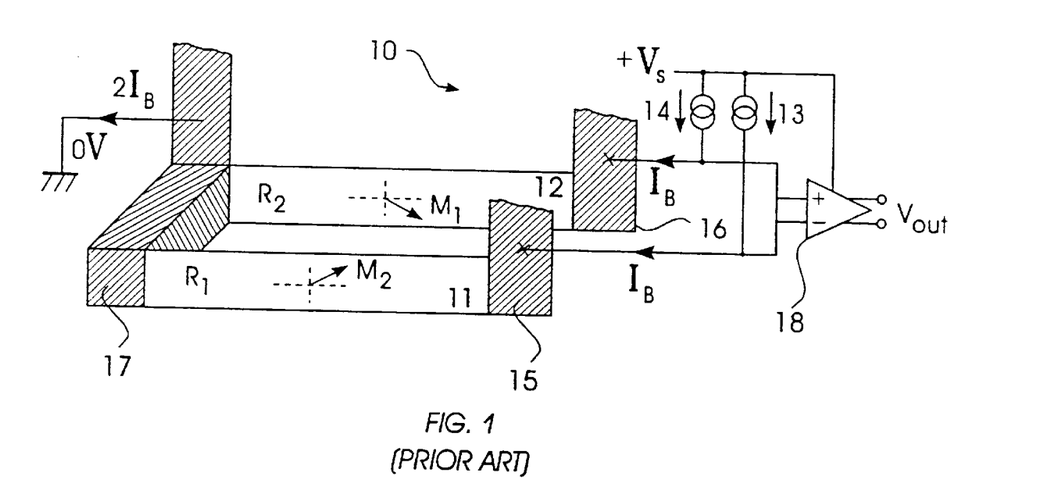
FIG. 1 depicts a conventional biasing arrangement for a dual MR sensor head.

FIG. 1 shows a conventional biasing arrangement 10 for a dual MR head used for detecting variations in a magnetic field on a disk (not shown), for example. A bias current $I_B$ flowing in each of two insulated MR sensors elements 11 and 12, which are placed in close proximity to each other, provides equal and opposite magnetic bias $M_1$, $M_2$, respectively, for the two elements. Current source 13 supplies $I_B$ to MR sensor element 11 through a conductor at 15, while current source 14 supplies $I_B$ to MR sensor element 12 through a conductor at 16. MR sensor elements 11 and 12 are connected together by a conductor at 17 forming a common node that is connected to ground. The two bias currents are combined at node 17 so that $2I_B$ flows to ground.

Variations in the disk magnetic field detected by sensor elements 11 and 12 are conventionally read out as indicated in FIG. 1. An amplifier 18 is used for detecting potential differences caused by changes in sensor element resistance resulting from variations in the disk magnetic field. The detected potential differences are output by amplifier 18 as $V_{OUT}$.

This conventional dual MR-sensor structure provides immunity against thermal asperities while also providing, in theory, a large Common-Mode Rejection Ratio (CMRR), making this sensor structure insensitive to (common-mode) interference caused, for example, by interference capacitively injected into the head. However, the CMRR of the head is limited by any relative imbalance of the resistances $R_1$ and $R_2$ of MR sensor elements 11 and 12, respectively.

Figure 2:
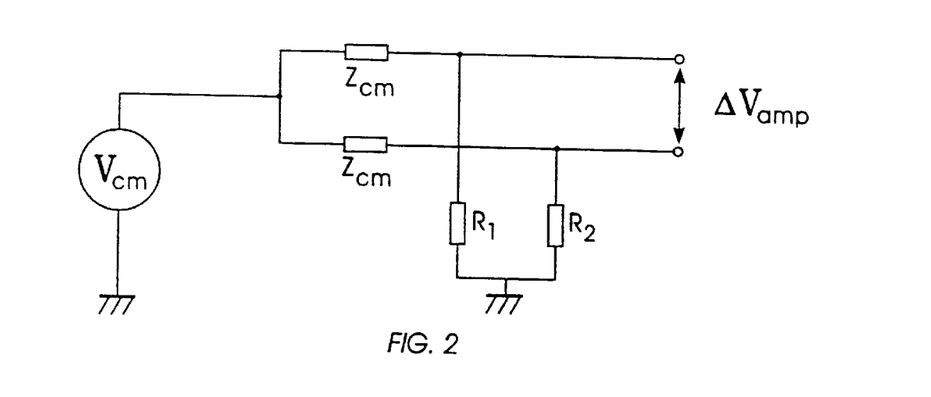
FIG. 2 shows a schematic block diagram for calculating a CMRR of a dual MR sensor head.

FIG. 2 shows a schematic block diagram used for calculating a CMRR of a dual MR sensor head. In FIG. 2, a common mode voltage $V_{cm}$ is applied through common mode impedances $Z_{cm}$ to sensor element resistances $R_1$ and $R_2$. From FIG. 2, the interference sensitivity for a single-ended MR-sensor configuration (i.e., $R_2=0$) using a single-ended input amplifier 18 is $$\frac{\Delta V_{amp}}{V_{cm}} \simeq \frac{R_1}{|Z_{cm}|} \quad (|Z_{cm}| \gg R_1) \tag{1}$$

For a differential MR-sensor configuration, that is, the dual sensor configuration ($R_1$, $R_2$) shown in FIG. 1, the interference sensitivity is $$\frac{\Delta V_{amp}}{V_{cm}} \simeq \frac{1}{|Z_{cm}|}|R_1 - R_2| \quad (|Z_{cm}| \gg R_1, R_2) \tag{2}$$

$$\frac{\Delta V_{amp}}{V_{cm}} \simeq \frac{R_1}{|Z_{cm}|}\left|1 - \frac{R_2}{R_1}\right| \tag{3}$$

Hence, the common-mode rejection ratio of the single-ended configuration over the differential configuration is $$CMRR \simeq 1 \Big/ \left|1 - \frac{R_2}{R_1}\right| \tag{4}$$

and depends on the relative resistance match $R_2/R_1$ of the two sensor elements 11 and 12. For $R_1=R_0(1\pm\epsilon)$ and $R_2=R_0(1\pm\epsilon)$ $$CMRR=(1+\epsilon)/2\epsilon \simeq 1/2\epsilon \tag{5}$$

For $\epsilon=5\%$, the CMRR is therefore only 10 (or 20 dB). CMRR values for conventional differential amplifiers, such as those used for amplifier 18, are typically on the order of 1000–2000, or 60–66 dB. Consequently, the overall CMRR of a conventional dual MR-sensor head with an electronic read-out as in FIG. 1 is primarily controlled by the resistance matching of the MR-sensors.

Further, conventional biasing arrangements provide that the disk and the common node 17 are at the same potential. Thus, any contact of a sensor element with the grounded disk results in the bias current $I_B$ flowing into the short-circuit with the disk causing a high spot-temperature and erosion of the sensor element.

SUMMARY OF THE INVENTION

It is an object of the invention to provide a biasing method and sensor read-out arrangement for a dual MR-sensor head that provides an overall high CMRR. It is another object of the invention to provide a biasing method and arrangement that allows the sensor elements of a dual MR-sensor head to have a potential that floats with respect to a potential of a disk, thus avoiding erosion of the sensor elements caused by the high spot-temperatures due to short-circuiting of the sensor elements to the disk.

These and other objects and advantages of the present invention are provided by a magnetoresistive head biasing arrangement that includes a magnetoresistive head, an amplifier, a current source circuit and a current sink circuit. Preferably, the head biasing arrangement is part of a magnetoresistive (MR) head/arm electronics (AE) circuit, which is part of a disk drive. The magnetoresistive head includes first and second magnetoresistive sensor elements that are coupled together at a common node and that sense variations in a magnetic field of a disk. The amplifier has first and second inputs, with the first input being coupled to a potential of the disk and the second input being coupled to a potential related to a potential of the magneto-resistive head. The amplifier has an output signal that is related to a difference between the potential of the disk and a potential related to the potential of the magnetoresistive head. Preferably, the amplifier output signal has a pass band that is lower than a data frequency band associated with the variations in the magnetic field of the disk.

The current source circuit is coupled to the first and second magnetoresistive elements, and is responsive to the output signal of the amplifier by supplying first and second bias currents to the first and second magnetoresistive sensor elements, respectively. Each respective bias current flows through the corresponding magnetoresistive element to the common node. The current sink circuit is coupled to the common node in such a way that the first and second bias currents combine at the common node and flow through the current sink circuit so that the first and second magnetoresistive elements each have a potential that floats with respect to the potential of the disk.

Preferably, the current source circuit includes first and second controlled current sources each having an output.

The output of the first controlled current source is coupled to the first magnetoresistive sensor element, while the output of the second controlled current source is coupled to the second magnetoresistive sensor element. The first and second controlled current sources are each responsive to the amplifier output signal by respectively supplying the first and second bias currents.

In one configuration of the present invention, the second input of the amplifier is coupled to the common node. Another configuration includes first and second resistors each having first and second ends. The first end of the first resistor is connected to the first end of the second resistor. The second end of the second resistor is connected to the common node, while the second end of the first resistor is coupled to either the output of the first controlled current source or the output of the second controlled current source. For this configuration, the second input of the amplifier is coupled to the first ends of the first and second resistors.

Yet another configuration includes first, second, third and fourth resistors each having first and second ends. The first end of each of the first, second and third resistors are connected together. The second end of the first resistor is connected to the output of the first controlled current source. The second end of the second resistor is connected to the output of the second controlled current source. The second end of the third resistor is connected to the first end of the fourth resistor, with the second end of the fourth resistor being connected to the common node. The second input of the amplifier is coupled to the second end of the third resistor.

Still another configuration of the present invention includes first, second and third resistors each having first and second ends. The first end of each of the first, second and third resistors are connected together. The second end of the first resistor is connected to the output of the first controlled current source. The second end of the second resistor is connected to the output of the second controlled current source, and the second end of the third resistor is connected to the common node. The second input of the amplifier for this configuration is coupled to the second end of the third resistor.

Yet another configuration of the present invention includes a differential amplifier having first and second inputs and a virtual ground node. The first input of the differential amplifier is coupled to the output of the first controlled current source. The second input of the differential amplifier is coupled to the output of the second controlled current source, and the second input of the amplifier is coupled to the virtual ground node.

The first controlled current source preferably includes a first transistor having first, second and third nodes, such that the first node of the first transistor is coupled to the output signal of the amplifier, and the second node of the first transistor is coupled to the first magnetoresistive sensor element. Similarly, the second controlled current source includes a second transistor having first, second and third nodes, such that the first node of the second transistor is coupled to the output signal of the amplifier, and the second node of the second transistor is coupled to the second magnetoresistive sensor element. The current source circuit also includes an impedance element coupled to the third input node of each of the first and second transistors. The impedance element can include first and second resistors, such that the first resistor is coupled to the third input node of the first transistor and the second resistor is coupled to the third input node of the second transistor. Alternatively, the impedance element can be a resistor coupled to the third input node of both of the first and second transistors.

To eliminate an offset voltage appearing between the two sensor elements, the present invention preferably includes a differential amplifier, an offset amplifier and a fourth current source. The differential amplifier has first and second inputs, and a virtual ground node. The first input of the differential amplifier is coupled to the output of the first controlled current source, and the second input of the differential amplifier is coupled to the output of the second controlled current source. The differential amplifier senses a difference between a potential related to the output of the first controlled current source and a potential related to the output of the second controlled current source and generates an offset output signal. Preferably, the second input of the voltage control amplifier is coupled to the virtual ground node. The offset amplifier is coupled to the offset output signal and generates a control signal. The control signal of the offset amplifier preferably has a bandwidth that is less than the data frequency band associated with the variations of the magnetic field of the disk. The fourth current source is coupled to either the first or second magnetoresistive sensor element and is responsive to the control signal by generating an offset current. The offset current combines with the bias current supplied to the first or second magnetoresistive sensor element, depending on which the fourth current source is connected to, so that the difference between the potential related to the output of the first controlled current source and the potential related to the output of the second controlled current source equals a predetermined offset. Preferably, the predetermined offset is zero.

The present invention also provides a method of biasing a magnetoresistive head having first and second magnetoresistive sensor elements. The method includes the steps of supplying a first bias current from a first current source to the first magnetoresistive sensor element; supplying a second bias current from a second current source to the second magnetoresistive sensor element; combining the first and second bias currents into a combined bias current after each bias current passes through the corresponding magnetoresistive sensor element; and supplying the combined bias current to a third current source. A difference is sensed between a potential of the disk and a potential related to a potential of the magnetoresistive head, and the first and second current sources are controlled based on the sensed difference between the potential of the disk and the potential related to the potential of the magnetoresistive head. According to the invention, a difference between a potential related to the output of the first current source and a potential related to the output of the second current source is also sensed. An offset current is then generated that is related to the sensed difference between the potential related to the output of the first current source and the potential related to the output of the second current source. The offset current is combined with the second bias current so that the difference between the potential related to the output of the first current source and the potential related to the output of the second current source equals a predetermined difference, preferably, zero.

BRIEF DESCRIPTION OF THE DRAWINGS

The present invention is illustrated by way of example and not limitation in the accompanying figures in which like reference numerals indicate similar elements and in which.

DETAILED DESCRIPTION OF THE PREFERRED EMBODIMENTS

Figure 3A:
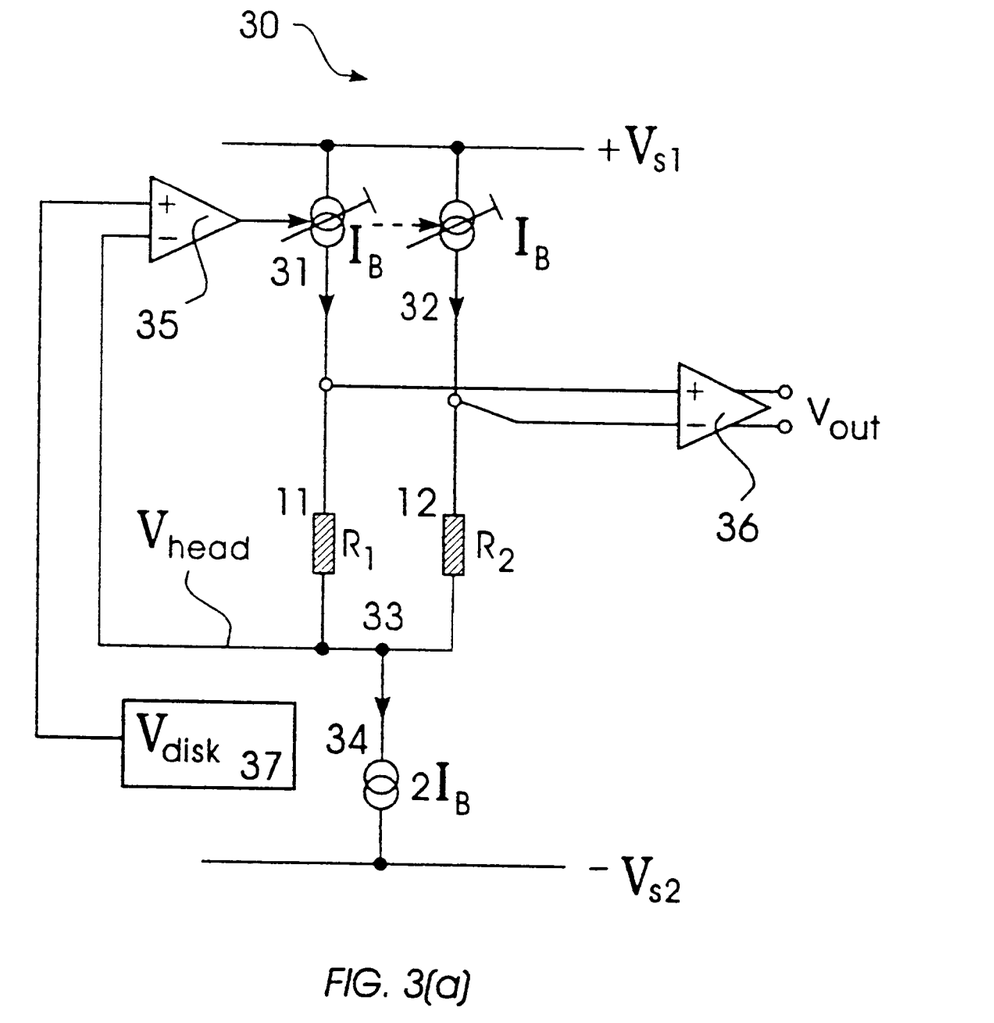
FIG. 3(a) shows a schematic block diagram of a biasing and read out arrangement providing a high CMRR using a floating dual MR sensor head according to the present invention.
Figure 3B:
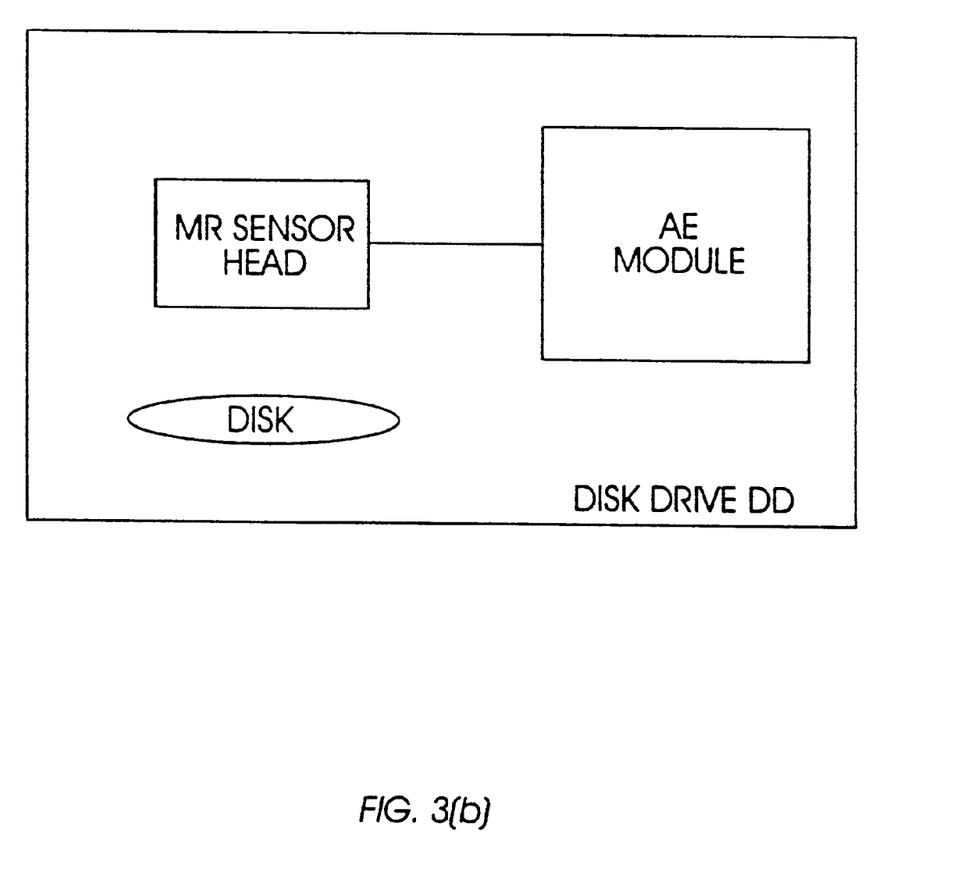
FIG. 3(b) shows a schematic block diagram of a disk drive utilizing the biasing arrangement of the present invention.

FIG. 3(a) shows a schematic block diagram of a biasing and read out arrangement of circuit 30 providing a "floating" dual MR-sensor head according to the present invention and achieving a high CMRR. The dual MR sensor elements 11 and 12 are made to "float" between three current sources that are all located inside an Arm Electronic (AE) Module shown in FIG. 3(b). AE module is part of a disk drive DD. Current source 31 supplies a bias current $I_B$ to sensor element 11, while current source 32 similarly supplies a bias current $I_B$ to sensor element 12. Current sources 31 and 32 are both coupled to a first supply voltage $+V_{S1}$.

Sensor elements 11 and 12 are connected together forming a common node at 33. A reference current source 34 (or current sink) connected to common node 33 sinks current $2I_B$ and provides the sum of the desired bias currents for the sensor elements 11 and 12. The other side of current source 34 is coupled to a second supply voltage $-V_{S2}$.

Current sources 31 and 32 are identical current sources with each sourcing $I_B$ and are both controlled by a low-frequency feedback loop such that the potential of the common sensor node 33 is at the same DC potential as the disk (not shown) over which the MR head flies. For example, the disk is at ground potential, that is, $V_{disk}=0$ Vdc.

The low-frequency feedback (or control) loop is provided by an amplifier 35 having an output signal that controls current sources 31 and 32. The inverting input of amplifier 35 is coupled to common node 33, while the non-inverting input is coupled in a well-known manner to $V_{disk}$, the potential of the disk. Current sources 31 and 32 are both responsive to the output of amplifier 35 so that the potential of the common node 33 is at the same DC potential as $V_{disk}$. For these MR sensor circuits to work, the disk potential must stay within the power supply rail potential, that is, $V_{S1} > V_{disk} > -V_{S2}$.

The voltage control loop maintains the head voltage $V_{head}$ at the same voltage as $V_{disk}$ for frequencies below the −3 dB low-pass band-end frequency associated with the loop. For very low frequencies, for example, frequencies <60 Hz which are well below the useful range, biasing circuit 30 provides a CMRR comparable to the CMRR of the conventional biasing circuit 10 of FIG. 1. However, for the higher frequencies of interest, that is, the frequency band associated with the variations in the magnetic field (data) of the disk, the current sources 31 and 32 are essentially uncontrolled and, therefore, constitute very high impedances to the power supply rails providing the desired high CMRR. The control circuit in FIG. 3 for low frequencies does not degrade the noise performance of the system beyond the noise performance of the conventional system shown in FIG. 1.

By keeping $V_{head}$ equal to $V_{disk}$, any short term short-circuits between sensor and disk essentially can draw no current and can therefore not damage the sensors. When a short-circuit occurs, the head potential $V_{head}$ will instantaneously follow the abrupt potential jump, but the current sources 31 and 32 cannot respond to the short-term short-circuit by virtue of the low-frequency voltage control loop. Thus, sensor element erosion caused by high spot-temperatures resulting from short-circuits is avoided.

Figure 4A:
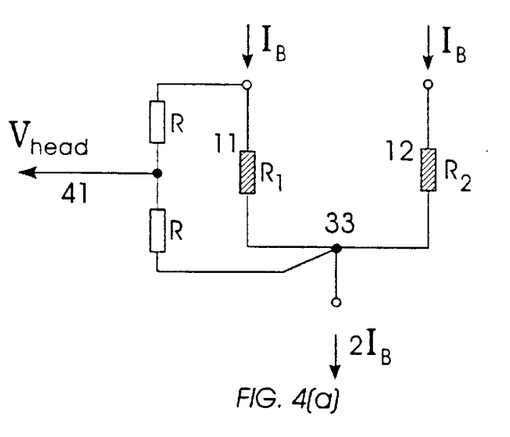
FIGS. 4(a)–4(c) are schematic block diagrams showing alternative circuit configurations for generating a head voltage $V_{head}$ according to the present invention.
Figure 4B:
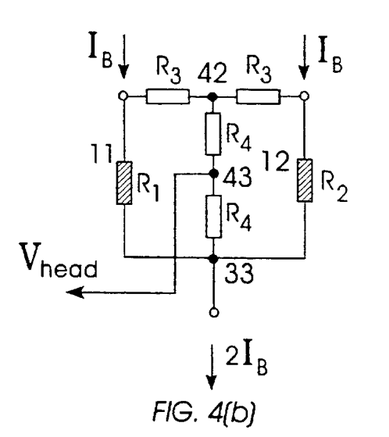
Figure 4C:
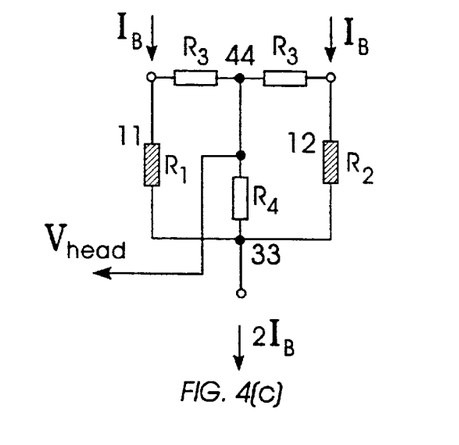

FIGS. 4(a)–4(c) are schematic block diagrams showing alternative circuit configurations for generating $V_{head}$ for providing an even smaller voltage difference between the dual MR sensor and a disk than that provided by the biasing arrangement of FIG. 3. In the resistive networks shown in FIGS. 4(a)–4(c), the resistance values R, $R_3$ and $R_4$ are each much greater that the resistance values of $R_1$ and $R_2$, thus avoiding extra noise bias current bleed off and signal loading by the resistance networks.

In FIG. 4(a), two resistances R are connected in series across either sensor element 11 or sensor element 12. $V_{head}$ is taken from node 41 where the two resistances R are connected together. In FIG. 4(b), two resistances $R_3$ are connected in series bridging sensor elements 11 and 12 opposite their common node connection at 33. Two more resistors R4 are connected in series between the common connection node 42 of resistors $R_3$ and common node 33. $V_{head}$ is taken from node 43 where the two resistors $R_4$ are connected together. In FIG. 4(c), two resistances $R_3$ are connected in series bridging sensor elements 11 and 12 opposite their common node connection at 33. A resistor $R_4$ is connected between the common connection node 44 of resistors $R_3$ and common node 33. $V_{head}$ is taken from common connection node 44. Values for resistances R, $R_3$ and $R_4$ are chosen in a well-known manner so that the resulting $V_{head}$ is substantially equal to the potential of the center (mid-point) of the two sensors 11 and 12.

Figure 5:
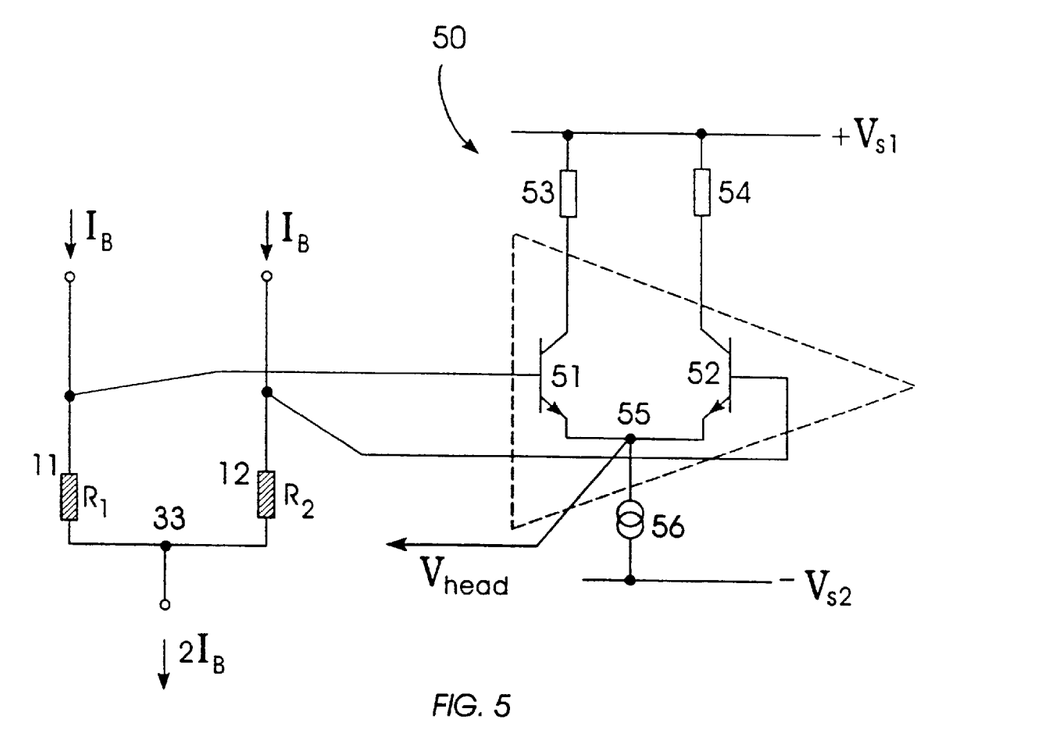
FIG. 5 shows a schematic block diagram of another circuit configuration for generating a head voltage $V_{head}$ according to the present invention.

FIG. 5 shows a schematic block diagram of another circuit configuration for generating head voltage $V_{head}$ that does not disturb the sensor symmetry like the resistive circuit networks of FIGS. 4(a)–4(c). FIG. 5 shows a differential input stage of a signal pre-amplifier 50 that is part of an AE module (FIG. 3(b)). The emitters of transistors 51 and 52 are connected together forming a common-emitter point, or virtual ground node 55. A current source 56 is connected to the common-emitter point 55 for biasing the transistor pair in a well-known manner. Resistors 53 and 54 are connected to the collectors of transistors 51 and 52, respectively, and to power supply $+V_{S1}$. The base of transistor 51 is coupled to MR sensor element 11 and the base of transistor 52 is coupled to MR sensor element 12. The head voltage $V_{head}$ is taken off the common-emitter point 55. While transistors 51 and 52 are shown as NPN transistors, PNP transistors can be used with appropriate well-known changes in the topography of the input stage.

Figure 6A:
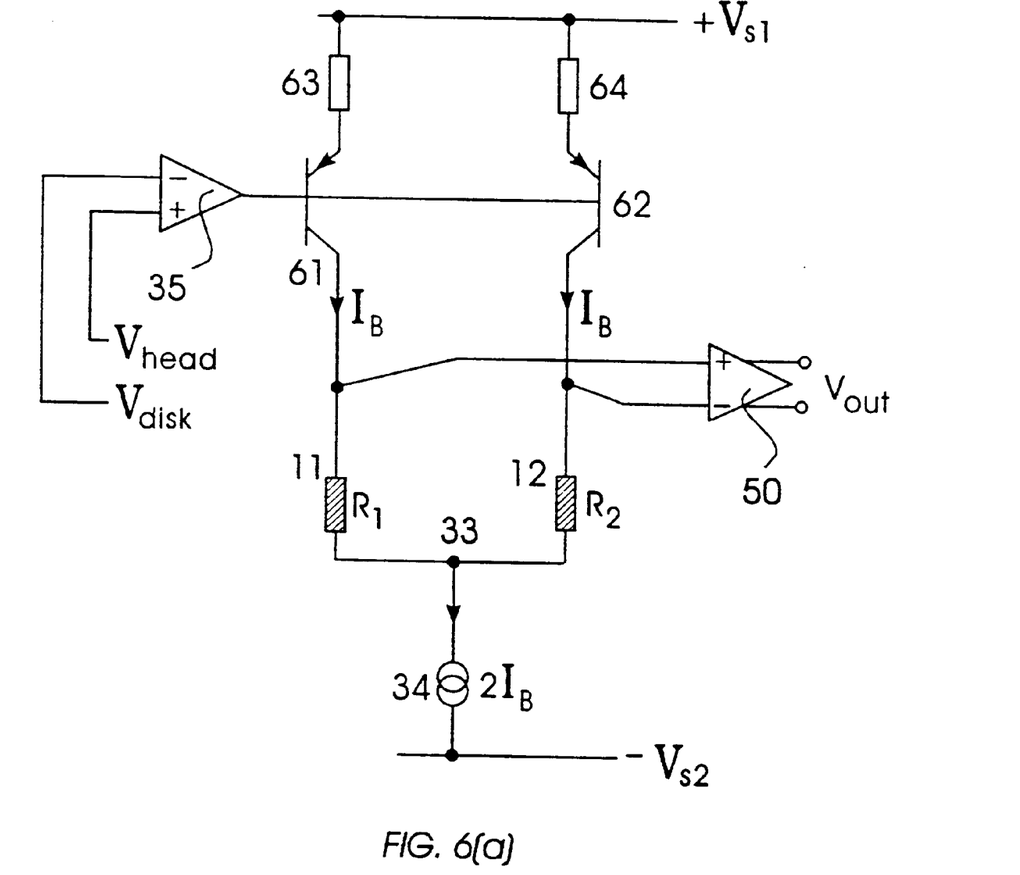
FIGS. 6(a) and 6(b) are schematic block diagrams showing two circuit configurations for controlled current sources providing a floating dual MR sensor head according to the present invention.
Figure 6B:
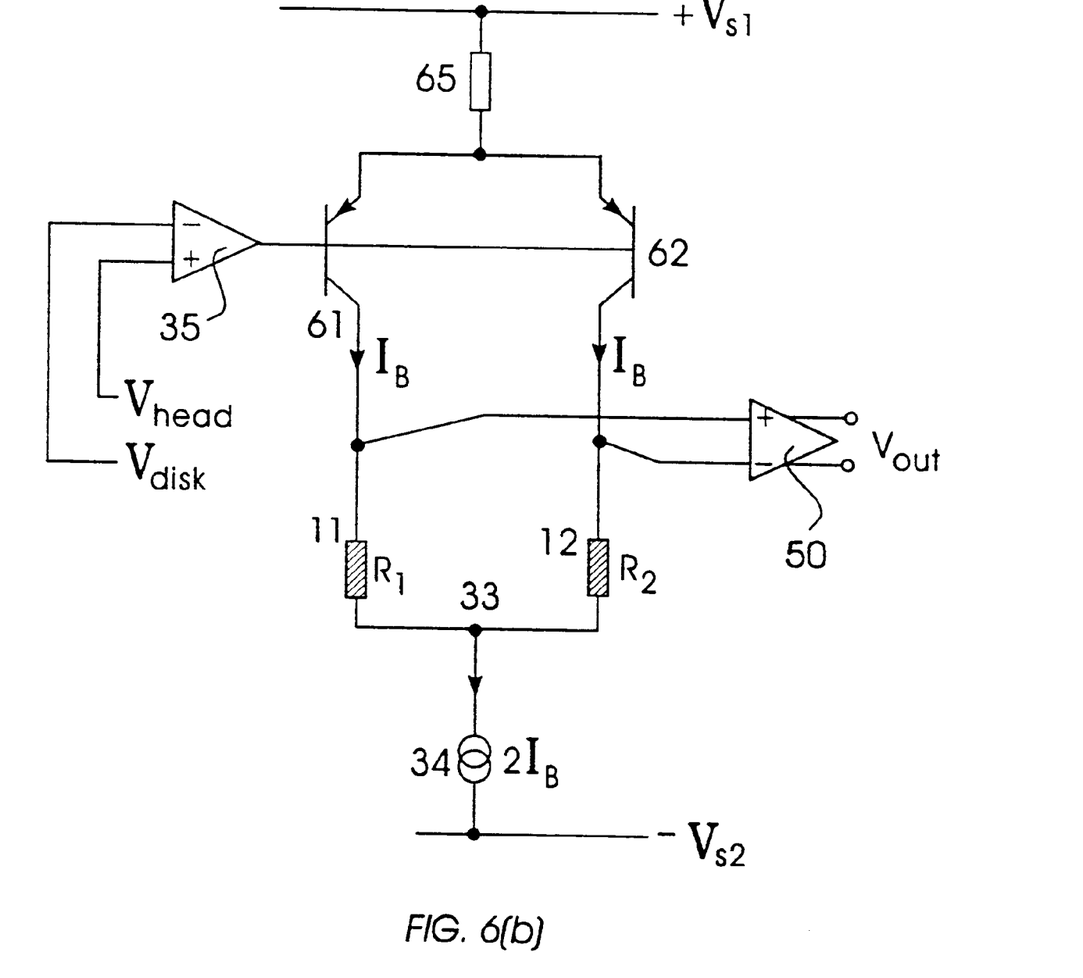

FIGS. 6(a) and 6(b) are schematic block diagrams showing two circuit configurations for controlled current sources 31 and 32. In FIG. 6(a), current source 31 includes a transistor 61, and current source 32 includes a transistor 62. The output of amplifier 35 is connected to the bases of transistors 61 and 62. The emitters of both transistors 61 and 62 are connected to power supply $+V_{S1}$ through identical resistors 63 and 64. The degree of matching of the two currents $I_B$ in FIG. 6(*a*) depends on the matching of transistors 61 and 61, and of resistors 63 and 64. In FIG. 6(*b*), the emitters of transistors 61 and 62 are connected together and to power supply $+V_{S1}$ through resistor 65. The degree of matching of the two currents $I_b$ for this circuit configuration depends only on the degree of matching between transistors 61 and 62. The $V_{disk}$ potential shown applied to amplifier 35 in FIG. 6 (and FIG. 7) can be derived using any of the techniques of the present invention for generating $V_{disk}$ (FIGS. 3–5).

Figure 7:
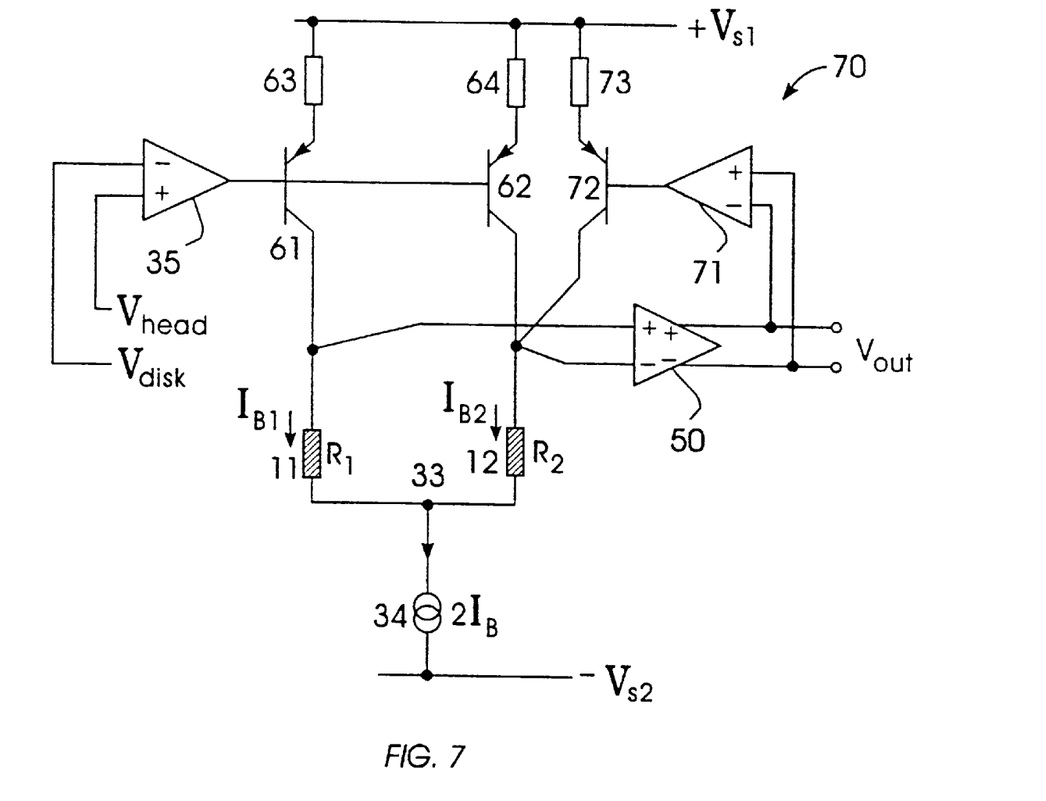
FIG. 7 shows a schematic block diagram of a biasing and read out arrangement providing a floating dual MR sensor head and having an offset control loop according to the present invention.

Any imbalance between the two currents $I_B$ for either circuit shown in FIG. 6 generates an input offset for signal pre-amplifier 50. FIG. 7 shows a schematic block diagram of a biasing arrangement having an offset voltage circuit 70 for eliminating an input offset for signal pre-amplifier 50. Consequently, pre-amplifier 50 does not require any AC coupling capacitors and can be DC coupled to sensor elements 11 and 12. Offset voltage circuit 70 includes an offset amplifier 71, a transistor 72 and a resistor 73. Amplifier 71 detects any offset in the output of signal-preamplifier 50 and outputs a control signal to the base of transistor 72. The emitter of transistor 72 is connected to power supply $+V_{S1}$, through resistor 73. The current through transistor 72 combines with the current through transistor 63 so that the DC input voltage into pre-amplifier 50 becomes a predetermined value, such as zero, for example. The bias currents in the two sensor elements 11 ($R_1$) and 12 ($R_2$) then satisfy $I_{B1 \cdot R1} = I_{B2} R_2$ or $I_{B1}/I_{B2} = R_2/R_1$. The head voltage control loop (containing amplifier 35) ensures that $$I_{B1}+I_{B2}=2I_b \ (V_{head} \text{control loop}) \quad (6)$$

Both the floating sensor (voltage control) loop and the offset voltage loop are active only for very low frequencies and DC, that is they are both limited to operation below the data frequency band associated with the variations of the magnetic field (data) of the disk.

While the present invention has been described in connection with the illustrated embodiments, it will be appreciated and understood that modifications may be made without departing from the true spirit and scope of the invention.

What is claimed is:

1. A magnetoresistive head biasing arrangement comprising:
    a magnetoresistive head including first and second magnetoresistive sensor elements, the first and second magnetoresistive sensor elements being coupled together at a common node;
    a first current source supplying a first bias current to the first magnetoresistive sensor element, the first bias current flowing through the first magnetoresistive element to the common node;
    a second current source supplying a second bias current to the second magnetoresistive sensor element, the second bias current flowing through the second magnetoresistive element to the common node; and
    a third current source coupled to the common node, the first and second bias currents combining at the common node and flowing through the third current source.

2. The magnetoresistive head biasing arrangement according to claim 1, wherein the biasing arrangement is part of a magnetoresistive (MR) head/arm electronics (AE) circuit.

3. The magnetoresistive head biasing arrangement according to claim 2, wherein the MR head/AE circuit is part of a disk drive.

4. The magnetoresistive head biasing arrangement according to claim 1, wherein the first and second magnetoresistive elements sense variations in a magnetic field of a disk; and
    wherein the magnetoresistive head biasing arrangement further comprises a voltage control amplifier having first and second inputs, the first input of the voltage control amplifier being coupled to a potential of the disk and the second input of the voltage control amplifier being coupled to a potential related to a potential of the magnetoresistive head, the voltage control amplifier having an output signal related to a difference between the potential of the disk and the potential related to the potential of the magnetoresistive head; and
    the first and second current sources being responsive to the output signal of the voltage control amplifier by supplying the first and second bias currents to the first and second magnetoresistive sensor elements, respectively, so that a potential of the common node equals the potential of the disk.

5. The magnetoresistive head biasing arrangement according to claim 4, wherein the first and second bias currents are equal.

6. The magnetoresistive head biasing arrangement according to claim 4, wherein the variations in the magnetic field of the disk have an associated data frequency band; and
    wherein the voltage control amplifier output signal has a bandwidth that is less that the data frequency band.

7. The magnetoresistive head biasing arrangement according to claim 4, wherein the second input of the voltage control amplifier is coupled to the common node.

8. The magnetoresistive head biasing arrangement according to claim 4, further comprising first and second resistors each having first and second ends, the first end of the first resistor being connected to the first end of the second resistor, the second end of the second resistor being connected to the common node, and the second end of the first resistor being coupled to one of the output of the first current source and the output of the second current source, and
    wherein the second input of the voltage control amplifier is coupled to the first end of both the first and second resistors.

9. The magnetoresistive head biasing arrangement according to claim 4, further comprising first, second, third and fourth resistors each having first and second ends, the first end of each of the first, second and third resistors being connected together, the second end of the first resistor being connected to the output of the first current source, the second end of the second resistor being connected to the output of the second current source, the second end of the third resistor being connected to the first end of the fourth resistor, and the second end of the fourth resistor being connected to the common node; and
    wherein the second input of the voltage control amplifier is coupled to the second end of the third resistor.

10. The magnetoresistive head biasing arrangement according to claim 4, further comprising first, second and third resistors each having first and second ends, the first end of each of the first, second and third resistors being connected together, the second end of the first resistor being connected to the output of the first current source, the second end of the second resistor being connected to the output of the second current source, the second end of the third resistor being connected to the common node; and wherein the second input of the voltage control amplifier is coupled to the second end of the third resistor.

11. The magnetoresistive head biasing arrangement according to claim 4, further comprising a differential amplifier having first and second inputs and a virtual ground node, the first input of the differential amplifier being coupled to the output of the first current source, the second input of the differential amplifier being coupled to the output of the second current source, and the second input of the voltage control amplifier being coupled to the virtual ground node.

12. The magnetoresistive head biasing arrangement according to claim 4, wherein the first current source includes a first transistor having first, second and third nodes, the first node of the first transistor being coupled to the output signal of the amplifier, the second node of the first transistor being coupled to the first magnetoresistive sensor element;

wherein the second current source includes a second transistor having first, second and third nodes, the first node of the second transistor being coupled to the output signal of the amplifier, the second node of the second transistor being coupled to the second magnetoresistive sensor element;

the magnetoresistive head biasing arrangement further comprising an impedance element coupled to the third input node of each of the first and second transistors.

13. The magnetoresistive head biasing arrangement according to claim 12, wherein the impedance element comprises first and second resistors, the first resistor being coupled to the third input node of the first transistor and the second resistor being coupled to the third input node of the second transistor.

14. The magnetoresistive head biasing arrangement according to claim 12, wherein the impedance element comprises a resistor coupled to the third input node of each of the first and second transistors.

15. The magnetoresistive head biasing arrangement according to claim 4, further comprising:

a differential amplifier having first and second inputs, the first input of the differential amplifier being coupled to the output of the first current source, the second input of the differential amplifier being coupled to the output of the second current source, the differential amplifier sensing a difference between a potential related to the output of the first current source and a potential related to the output of the second current source and generating an offset output signal;

an offset amplifier coupled to the offset output signal and generating a control signal; and a fourth current source coupled to one of the first and second magnetoresistive sensor elements and responsive to the control signal by generating an offset current, the offset current combining with the bias current to the one of the first and second magnetoresistive sensor elements so that the difference between the potential related to the output of the first current source and the potential related to the output of the second current source equals a predetermined offset.

16. The magnetoresistive head biasing arrangement according to claim 15, wherein the differential amplifier includes a virtual ground node, and the second input of the voltage control amplifier is coupled to the virtual ground node.

17. The magnetoresistive head biasing arrangement according to claim 16, wherein the predetermined offset is zero.

18. The magnetoresistive head biasing arrangement according to claim 17, wherein the variations in the magnetic field of the disk have an associated data frequency band; and wherein each of the voltage control amplifier output signal and the control signal of the offset amplifier has a bandwidth that is less than the data frequency band.

19. A magnetoresistive head biasing arrangement comprising:

a magnetoresistive head including first and second magnetoresistive sensor elements, the first and second magnetoresistive sensor elements being coupled together at a common node and sensing variations in a magnetic field of a disk;

a voltage control amplifier having first and second inputs, the first input being coupled to a potential of the disk and the second input being coupled to a potential related to a potential of the magnetoresistive head, the voltage control amplifier having an output signal related to a difference between the potential of the disk and the potential related to the potential of the magnetoresistive head;

a current source circuit coupled to the first and second magnetoresistive elements, the current source circuit being responsive to the output signal of the voltage control amplifier by supplying first and second bias currents to the first and second magnetoresistive sensor elements, respectively, each respective bias current flowing through the corresponding magnetoresistive element to the common node so that the first and second magnetoresistive elements each have a potential that floats with respect to the potential of the disk; and a current sink circuit coupled to the common node, the first and second bias currents combining at the common node and flowing through the current sink circuit.

20. The magnetoresistive head biasing arrangement according to claim 19, wherein the biasing arrangement is part of magnetoresistive (MR) head/arm electronics (AE) circuit.

21. The magnetoresistive head biasing arrangement according to claim 20, wherein the MR/ME circuit is part of a disk drive.

22. The magnetoresistive head biasing arrangement according to claim 19, wherein the current source circuit includes first and second controlled current sources each having an output, the output of the first controlled current source being coupled to the first magnetoresistive sensor element and the output of the second controlled current source being coupled to the second magnetoresistive sensor element, the first and second controlled current sources each being responsive to the amplifier output signal by respectively supplying the first and second bias currents.

23. The magnetoresistive head biasing arrangement according to claim 22, wherein the first and second bias currents are equal.

24. The magnetoresistive head biasing arrangement according to claim 22, wherein the variations in the magnetic field of the disk have an associated data frequency band; and wherein the voltage control amplifier output signal has a bandwidth that is less that the data frequency band.

25. The magnetoresistive head biasing arrangement according to claim 22, wherein the second input of the voltage control amplifier is coupled to the common node.

26. The magnetoresistive head biasing arrangement according to claim 22, further comprising first and second resistors each having first and second ends, the first end of the first resistor being connected to the first end of the second resistor, the second end of the second resistor being connected to the common node, and the second end of the first resistor being coupled to one of the output of the first controlled current source and the output of the second controlled current source, and wherein the second input of the voltage control amplifier is coupled to the first end of both the first and second resistors.

27. The magnetoresistive head biasing arrangement according to claim 22, further comprising first, second, third and fourth resistors each having first and second ends, the first end of each of the first, second and third resistors being connected together, the second end of the first resistor being connected to the output of the first controlled current source, the second end of the second resistor being connected to the output of the second controlled current source, the second end of the third resistor being connected to the first end of the fourth resistor, and the second end of the fourth resistor being connected to the common node; and wherein the second input of the voltage control amplifier is coupled to the second end of the third resistor.

28. The magnetoresistive head biasing arrangement according to claim 22, further comprising first, second and third resistors each having first and second ends, the first end of each of the first, second and third resistors being connected together, the second end of the first resistor being connected to the output of the first controlled current source, the second end of the second resistor being connected to the output of the second controlled current source, the second end of the third resistor being connected to the common node; and wherein the second input of the voltage control amplifier is coupled to the second end of the third resistor.

29. The magnetoresistive head biasing arrangement according to claim 22, further comprising a differential amplifier having first and second inputs and a virtual ground node, the first input of the differential amplifier being coupled to the output of the first controlled current source, the second input of the differential amplifier being coupled to the output of the second controlled current source, and the second input of the voltage control amplifier being coupled to the virtual ground node.

30. The magnetoresistive head biasing arrangement according to claim 22, wherein the first controlled current source includes a first transistor having first, second and third nodes, the first node of the first transistor being coupled to the output signal of the amplifier, the second node of the first transistor being coupled to the first magnetoresistive sensor element;

wherein the second controlled current source includes a second transistor having first, second and third nodes, the first node of the second transistor being coupled to the output signal of the amplifier, the second node of the second transistor being coupled to the second magnetoresistive sensor element;

the current source circuit further includes an impedance element coupled to the third input node of each of the first and second transistors.

31. The magnetoresistive head biasing arrangement according to claim 30, wherein the impedance element comprises first and second resistors, the first resistor being coupled to the third input node of the first transistor and the second resistor being coupled to the third input node of the second transistor.

32. The magnetoresistive head biasing arrangement according to claim 30, wherein the impedance element comprises a resistor coupled to the third input node of each of the first and second transistors.

33. The magnetoresistive head biasing arrangement according to claim 22, further comprising:

a differential amplifier having first and second inputs, the first input of the differential amplifier being coupled to the output of the first controlled current source, the second input of the differential amplifier being coupled to the output of the second controlled current source, the differential amplifier sensing a difference between a potential related to the output of the first controlled current source and a potential related to the output of the second controlled current source and generating an offset output signal;

an offset amplifier coupled to the offset output signal and generating a control signal; and a fourth current source coupled to one of the first and second magnetoresistive sensor elements and responsive to the control signal by generating an offset current, the offset current combining with the bias current supplied to the one of the first and second magnetoresistive sensor elements so that the difference between the potential related to the output of the first controlled current source and the potential related to the output of the second controlled current source equals a predetermined offset.

34. The magnetoresistive head biasing arrangement according to claim 33, wherein the differential amplifier includes a virtual ground node, and the second input of the voltage control amplifier is coupled to the virtual ground node.

35. The magnetoresistive head biasing arrangement according to claim 34, wherein the predetermined offset is zero.

36. The magnetoresistive head biasing arrangement according to claim 35, wherein the variations in the magnetic field of the disk have an associated data frequency band; and wherein each of the voltage control amplifier output signal and the control signal of the offset amplifier has a bandwidth that is less than the data frequency band.

37. A method of biasing a magnetoresistive head having first and second magnetoresistive sensor elements that are coupled together at a common node, the method comprising the steps of:

supplying a first bias current from a first current source to the first magnetoresistive sensor element, the first bias current flowing through the first magnetoresistive sensor element to the common node;

supplying a second bias current from a second current source to the second magnetoresistive sensor element, the second bias current flowing through the second magnetoresistive sensor element to the common node;

combining the first and second bias currents into a combined bias current at the common node after each respective bias current passes through the corresponding magnetoresistive sensor element; and supplying the combined bias current to a third current source.

38. The method according to claim 37, wherein the first and second magnetoresistive sensor elements sense variations in a magnetic field of a disk, the method further comprising the steps of:

sensing a difference between a potential of the disk and a potential related to a potential of the magnetoresistive head; and controlling the first and second current sources based on the sensed difference between the potential of the disk and the potential related to the potential of the magnetoresistive head.

39. The method according to claim 38, further comprising the steps of:

sensing a difference between a potential related to the output of the first current source and a potential related to the output of the second current source;

generating an offset current related to the sensed difference between the potential related to the output of the first current source and the potential related to the output of the second current source; and combining the offset current with the second bias current so that the difference between the potential related to the output of the first current source and the potential related to the output of the second current source equals a predetermined difference.

40. The method according to claim 39, wherein the predetermined difference equals zero.

41. The method according to claim 40, wherein the magnetoresistive head is part of a magnetoresistive (MR) head/arm electronics (AE) circuit.

42. The method according to claim 41, wherein the MR head/AE circuit is part of a disk drive.

* * * * *